United States Patent [19]

Landphair et al.

[11] Patent Number: 4,607,708

[45] Date of Patent: Aug. 26, 1986

[54] FOLDABLE FRAME FLEXING HINGE

[75] Inventors: Donald K. Landphair, Bettendorf, Iowa; Gordon L. Salley, Moline, Ill.

[73] Assignee: Deere & Company, Moline, Ill.

[21] Appl. No.: 592,523

[22] Filed: Mar. 23, 1984

[51] Int. Cl.[4] .................. A01B 73/00; A01B 63/22; B62D 53/00

[52] U.S. Cl. .................. 172/776; 172/311; 172/457; 280/411 A

[58] Field of Search ........... 172/311, 456, 776, 310, 172/457, 477, 636, 658; 280/411 A, 411 R, 656

[56] References Cited

U.S. PATENT DOCUMENTS

| 1,724,143 | 8/1929 | Penland | 172/310 |
| 3,654,999 | 4/1972 | Fischer | 172/456 X |
| 3,982,773 | 9/1976 | Stufflebeam et al. | 172/456 X |
| 4,137,852 | 2/1979 | Pratt | 172/456 X |
| 4,172,537 | 10/1979 | Gandrud et al. | 172/311 X |
| 4,211,287 | 7/1980 | Garrison | 172/311 |
| 4,223,743 | 9/1980 | Garrison | 172/311 X |
| 4,355,689 | 10/1982 | Friggstad | 172/311 X |
| 4,364,581 | 12/1982 | Shoup | 172/311 X |

Primary Examiner—Richard J. Johnson
Assistant Examiner—Terrence L. B. Brown
Attorney, Agent, or Firm—Henderson & Sturm

[57] ABSTRACT

A forwardly foldable implement frame having a horizontal pivot or flex hinge to enable vertical flexing of the wing sections to follow the ground contour. The frame includes a pair of cam bumpers rigidly attached to the wing beam in near proximity to the flex hinge. Folding of the wing sections toward one another causes the cam bumpers to contact and automatically lock out the flex hinge.

7 Claims, 5 Drawing Figures

FOLDABLE FRAME FLEXING HINGE

TECHNICAL FIELD

This invention relates to implement frames, and more particularly to foldable implement frames utilizing a horizontal pivot which enables vertical flexing of transverse frame wing sections.

BACKGROUND ART

The trend to large scale farming operations and the desire to achieve and maintain ever increasing productivity levels has led to various procedures and implements designed to maximize efficient use of labor and equipment. One accepted method of maximizing efficiency is to utilize large scale implements which require extensive frames that can be unfolded to a wide effective working width in the field, and folded to an acceptably narrow configuration for transport from field to field.

Foldable agricultural implement frames are generally of three basic types wherein the sections are folded to the rear, vertically, or to the front. The forward fold configuration is widely favored and an excellent example of the forward folding implement frame is found in U.S. Pat. No. 4,137,852. When the implement frame extends to a great width in the unfolded operational mode, it is desirable to provide for vertical flexing of the frame sections so that the implements attached to the frame will follow the contour of the ground. This vertical flexing is typically provided by a horizontal pivot interconnecting frame wing sections and disposed in a general fore-and-aft direction when the frame is in the transversely extended operational mode.

One problem associated with flexing frames is that the flexing horizontal pivot or hinge must be rendered rigid or locked out when the frame is folded to the narrow configuration for transport. Various methods of locking out the flex hinge have been devised but none have proven completely satisfactory.

Those concerned with these and other problems recognize the need for an improved implement frame.

DISCLOSURE OF THE INVENTION

The present invention provides a forwardly foldable frame having a horizontal pivot or flex hinge that enables vertical flexing of the frame wing sections as well as a pair of cam bumpers that contact and automatically lock out the flex hinge as the frame moves from the unfolded operational position to the folded transport position. The cam bumpers are rigidly attached to their respective wing sections so that they extend out and approach contact with each other as the wings fold. The bumpers are also positioned on the wing sections in near proximity to the flex hinge so that contact of the bumpers effectively locks out the flex hinge.

An object of the present invention is the provision of an improved forwardly foldable implement frame.

Another object is to provide an implement frame having a horizontal fore-and-aft pivot that enables vertical flexing of the wing sections.

A further object of the invention is the provision of an implement frame having a flex hinge and an automatic lock out for the flex hinge as the frame is moved to the folded transport position.

Still another object is to provide a flex hinge lock out that utilizes the folding geometry of an implement frame as it folds.

A still further object of the present invention is the provision of a flex hinge lock out that is easy and inexpensive to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
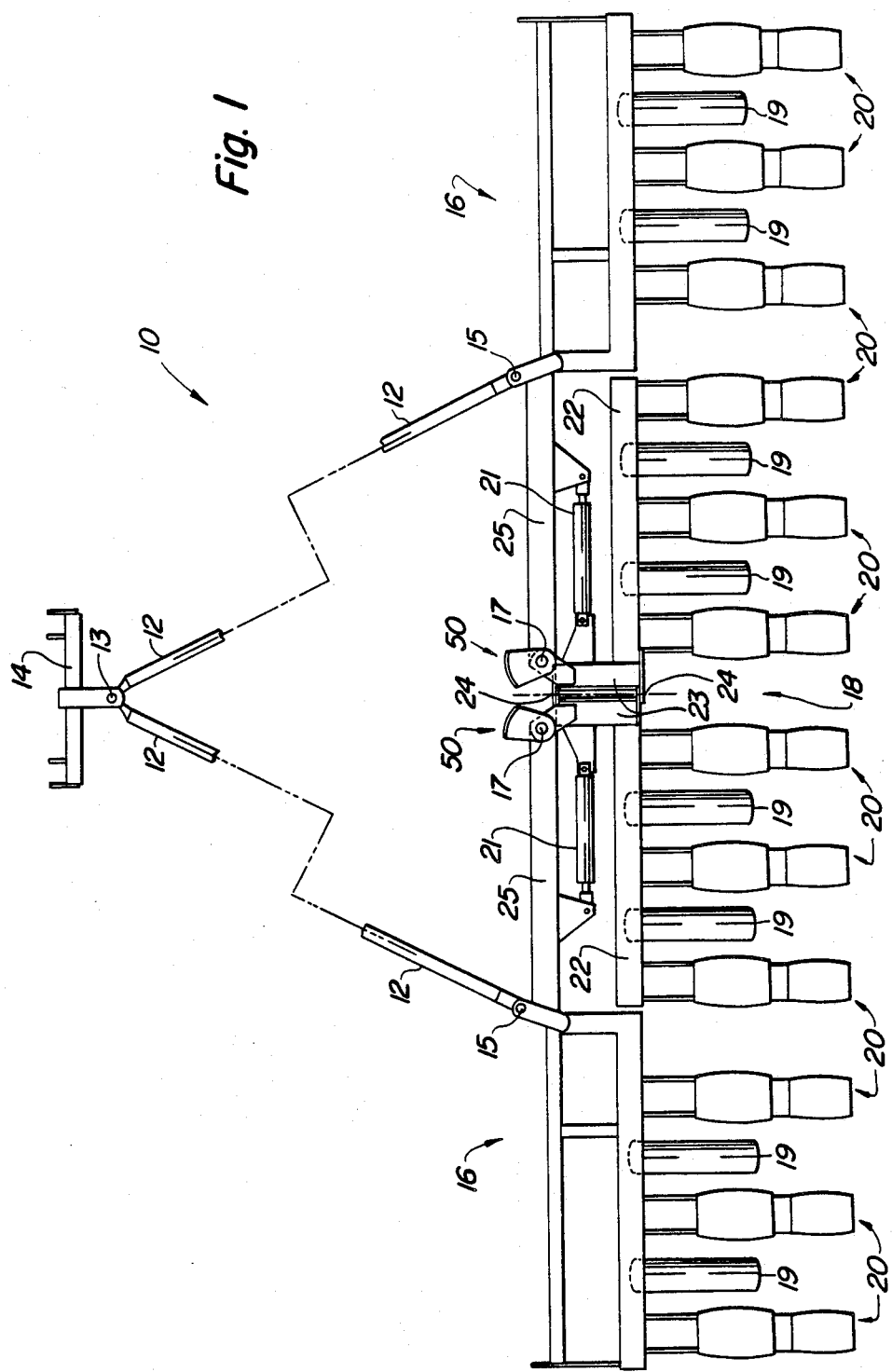
FIG. 1 is a top plan view showing a forwardly foldable implement frame having a horizontal pivot flex hinge which enables vertical flexing of transverse wing sections, and having a pair of bumper cams disposed to contact and lock out the flex hinge when the frame is folded forwardly to the transport position.
Figure 2:
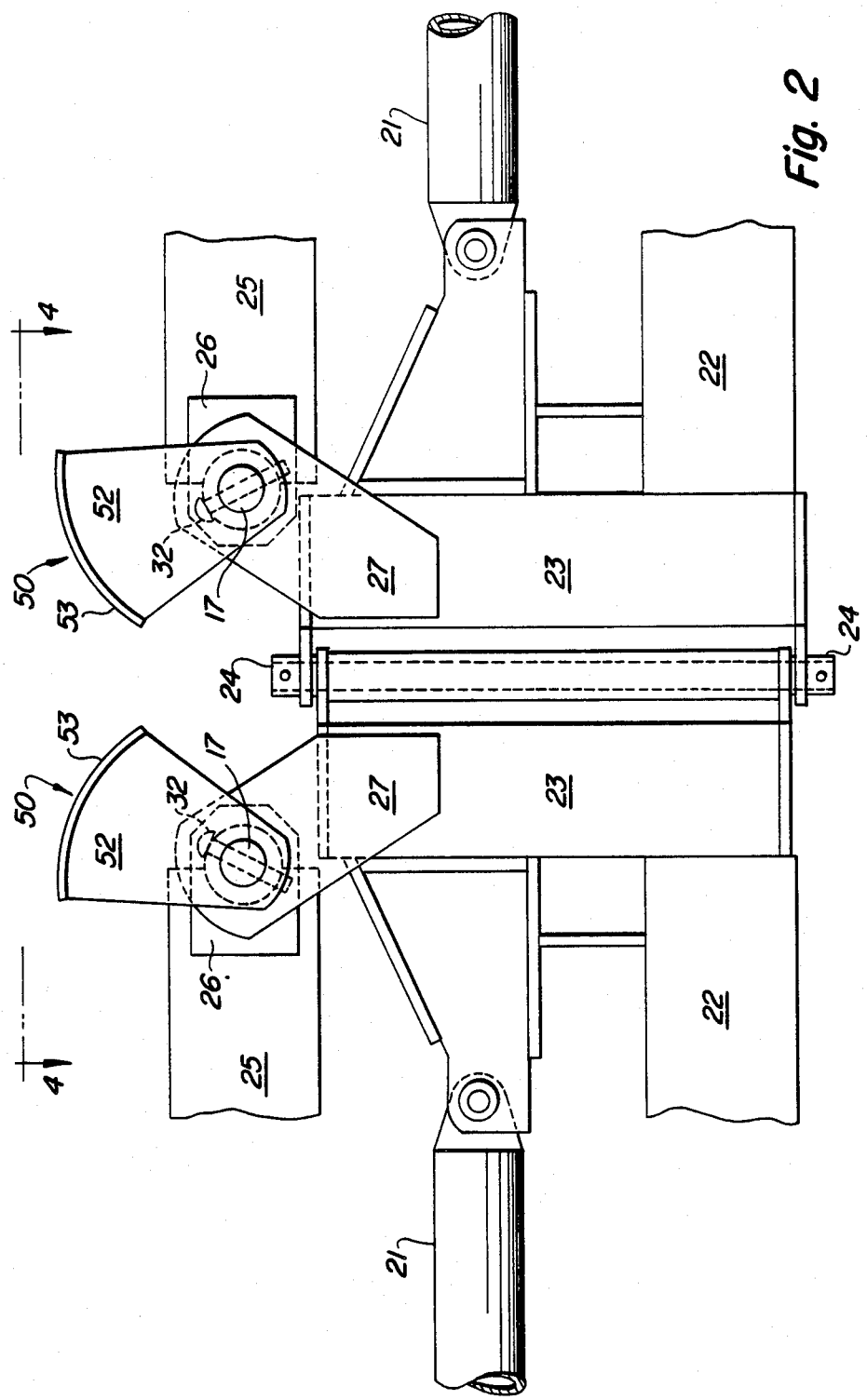
FIG. 2 is an enlarged cut-away plan view showing the bumper cams in the FIG. 1 position where the frame is in the unfolded operational position.

Referring now to the drawings wherein like reference numerals designate identical or corresponding parts throughout the several views, FIG. 1 shows a forwardly foldable implement frame (10) including a pair of fore-and-aft draft tubes (12) having their forward ends pivotally connected by vertical hitch pin (13) and supported on a drawbar (14) of a draft vehicle (not shown), and having their rearward ends pivotally attached by vertical pins (15) to right and left wing sections (16). The wing sections (16) are conventionally mirror images of each other and both are pivotally attached by vertical pin (17) to a central frame section (18). As is typical, each of the wing sections (16) and the center section (18) is supported by ground wheels (19) and they may carry any form of agricultural tool such as the planting units (20) illustrated in FIG. 1.

The frame (10) is moved between the folded transport position and the unfolded operational position (FIG. 1), by selective activation of the hydraulic cylinders (21). Retraction of the hydraulic cylinders (21) forces the right and left wing sections (16) to move in an arcuate path about their respective vertical pivots (17) until the wing sections (16) are transversely aligned with the center section (18).

Extending forward from the center section beams (22) are a pair of short fore-and-aft beams (23) that are pivotally interconnected by fore-and-aft horizontal pivot pin or flex hinge (24). The horizontal pivot (24) enables vertical flexing of the wing sections (16), and the associated center beams (22), when the wing sections (16) are transversely extended to the unfolded operational position of FIG. 1. A pair of cam bumpers (50) are rigidly attached to the wing beams (25) by welding to the pin (17).

Figure 3:
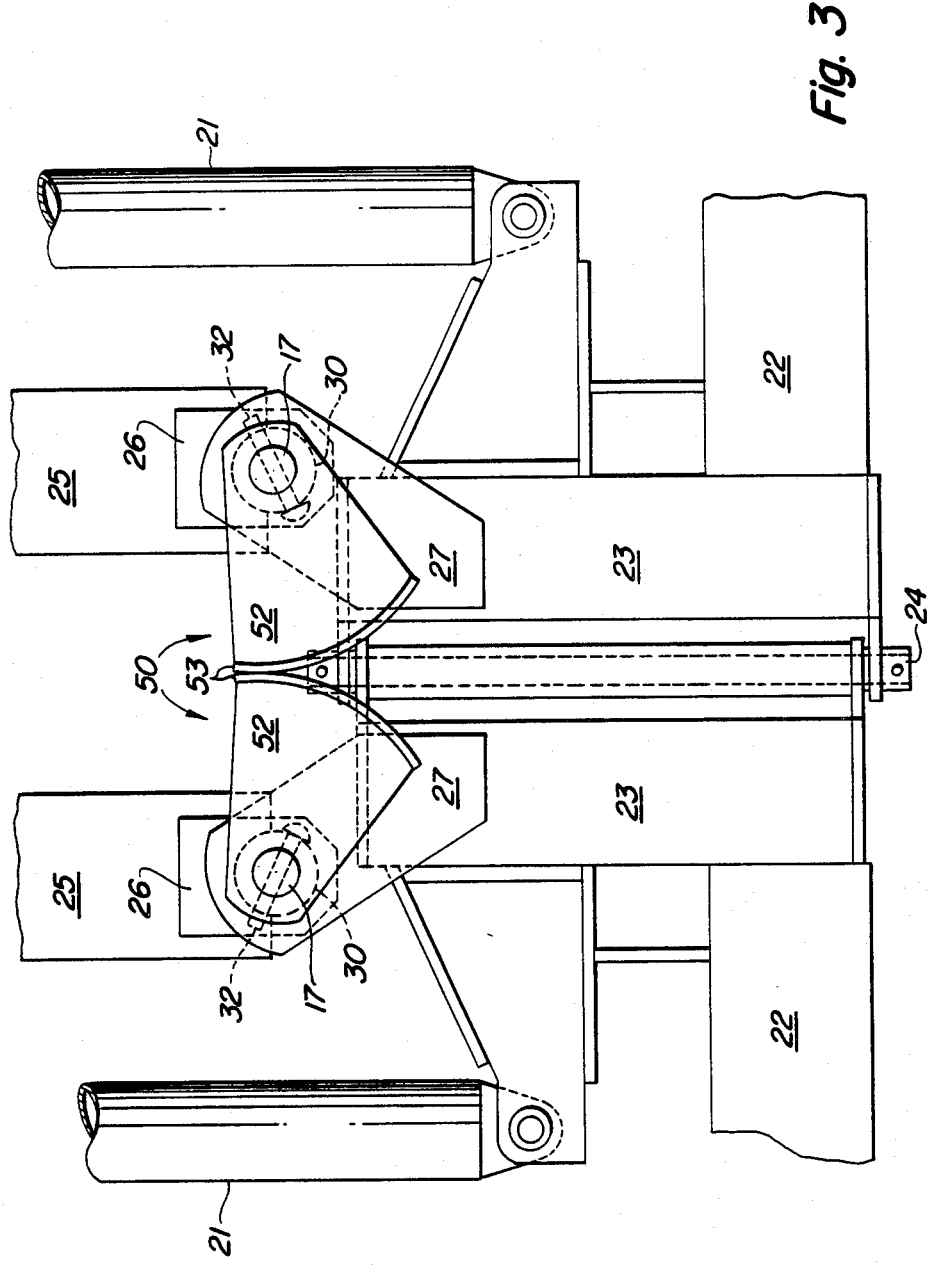
FIG. 3 is an enlarged cut-away plan view similar to FIG. 2, but showing the bumper cams when the frame is moved to the folded transport position.
Figure 4:
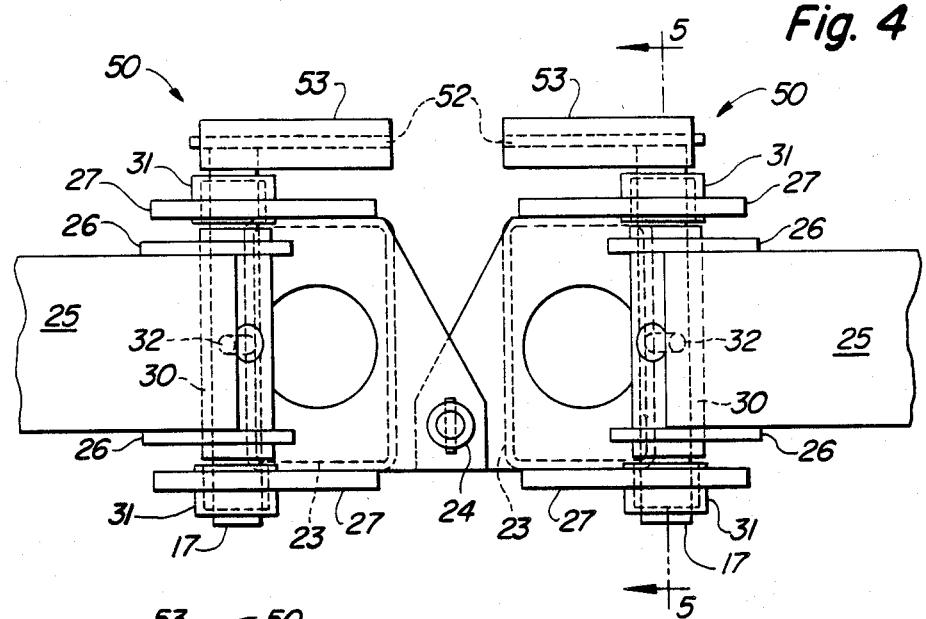
FIG. 4 is an enlarged front elevational view taken along line 4—4 of FIG. 2.

As shown most clearly in FIGS. 3-4, the vertical pivot pin (17) is journalled in a vertical sleeve (30) extending between upper and lower clevis plates (26) attached to the wing beam (25). Also, the pin (17) is journalled within bearings (31) in upper and lower clevis plates (27) which forwardly diverge from fore-and-aft beams (23). Both the pivot pin (17) and the sleeve (30) have registerable openings to receive a bolt (32) which prevents the rotation of the pin (17) with respect to the sleeve (30) and consequently with respect to the wing beam (25). Since the cam bumper (50) is rigidly attached to the pin (17), the bumper (50) will rotate as the wing beam (25) rotates in moving between the extended operational position and the folded transport position.

Figure 5:
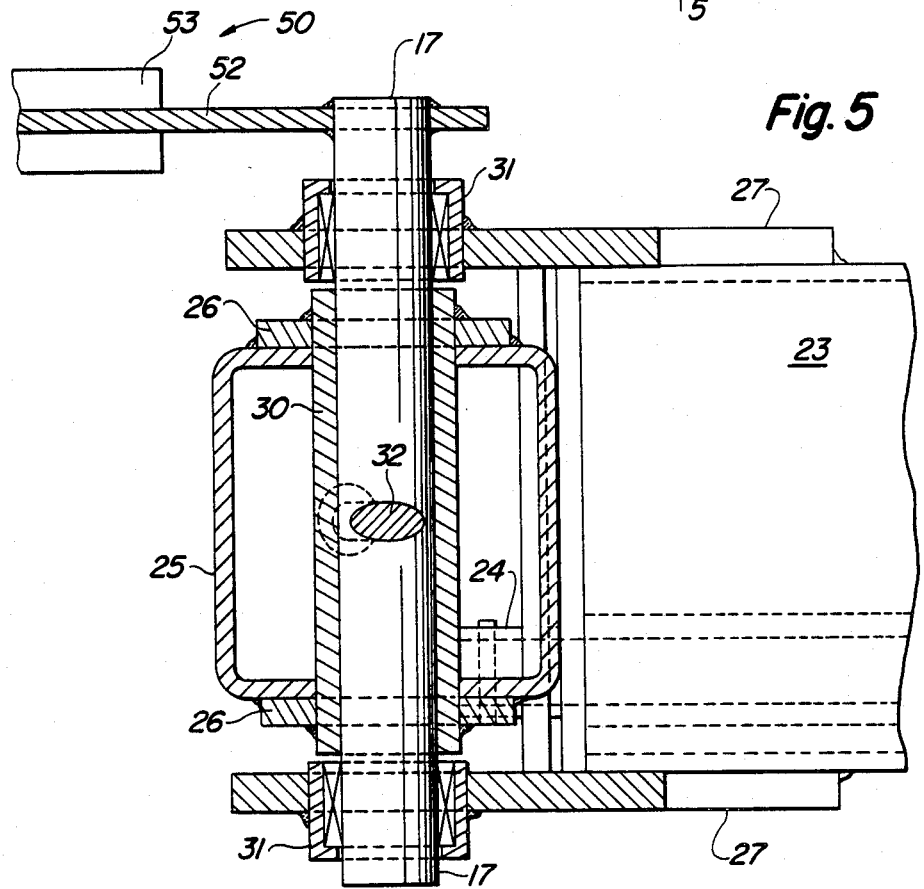
FIG. 5 is a greatly enlarged sectional view taken along line 5—5 of FIG. 4.

The cam bumper (50) includes a horizontal plate (52) having an opening to receive the pin (17) for welding (FIG. 5). The plate (52) carries a contact strip (53) that defines a cam surface at the outer edge.

As the frame (10) is folded, the wing sections (16) are able to collapse toward each other since they are still capable of pivoting about flex hinge (24). As shown in FIG. 3, the cam bumpers (50) come in contact with each other as the frame (10) is folded and act to render the flex hinge (24) rigid by locking it out of its ability to pivot. The contact strips (53) of an opposing pair of cam bumpers first make contact as the frame (10) is folded such that the wing sections (16) are about midway between the unfolded operational and folded transport positions. The contact strips (53) remain in contact while the frame (10) moves to the fully folded position illustrated in FIG. 3. When in contact, the cam bumpers (50) prevent pivoting of the wing sections (16) with respect to the flex hinge (24).

The cam bumpers (50) are integrated into the folding geometry of the folding frame such that the flex hinge (24) is automatically locked out as the wing sections fold forward. This eliminates the need for a separate operation, such as the manual installation of a compression link, in preparing the frame for safe, stable transport from field to field.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. In a forwardly foldable implement frame having a pair of foldable wing sections attached to the hitch of a draft vehicle and being pivotally movable toward and away from each other between a folded transport position and an unfolded operational postion by selective activation of a power means; and a horizontal fore-and-aft pivot flex hinge interconnecting said wing sections to enable vertical flexing of the wing sections to follow the contour of the ground when the wing sections are disposed in the unfolded operational position, the improvement comprising:

a first bumper rigidly attached to one of said wing sections and directed to extend toward and contact the other of said wing sections at a point vertically spaced from and adjacent to said flex hinge when said wing sections move toward said folded transport position, wherein said contact restricts said flex hinge from pivotal movement.

2. The implement frame of claim 1 further including a second bumper rigidly attached to the other of said wing sections and directed to extend toward and contact said first bumper when said wing sections move toward said folded transport position.

3. The implement frame of claim 1 wherein said first bumper includes a horizontally disposed plate and an arcuate contact strip disposed at the outer edge of said plate in contacting relationship with the other of said wing sections.

4. The implement frame of claim 3 wherein said contact strip extends above and below the edge of said plate.

5. In a forwardly foldable implement frame having a pair of foldable wing sections attached to the hitch of a draft vehicle and being pivotally movable toward and away from each other between a folded transport position and an unfolded operational position by selective activation of a power means; and a horizontal fore-and-aft pivot flex hinge interconnecting said wing sections to enable vertical flexing of the wing sections to follow the contour of the ground when the wing sections are disposed in the unfolded operational position, the improvement comprising:

a first bumper rigidly attached to one of said wing sections and directed to extend toward and contact the other of said wing sections at a point adjacent to said flex hinge when said wing sections move toward said folded transport position, wherein said contact restricts said flex hinge from pivotal movement; and a second bumper rigidly attached to the other of said wing sections and directed to extend toward and contact said first bumper when said wing sections move toward said folded transport position, wherein said first and second bumpers each include a horizontally disposed plate and an arcuate contact strip disposed at the outer edge of said plate wherein the arcuate contact strips of the first and second bumpers are disposed in contacting relationship.

6. The implement frame of claim 4 wherein said contact strip extends above and below the edge of said plate.

7. The implement frame of claim 6 wherein contact is made between said first and second bumper when the wing sections are moved about midway between said folded and unfolded positions.

* * * * *